United States Patent [19]
Pfau et al.

[11] 3,739,135
[45] June 12, 1973

[54] ELECTRO-EROSION MACHINING APPARATUS

[75] Inventors: Jean Pfau, Collonge-Bellerive, (Geneva), Switzerland; Hubert Schaidl, Munich, Germany

[73] Assignee: Ateliers des Charmilles, S.A., Geneve, Switzerland

[22] Filed: Oct. 20, 1971

[21] Appl. No.: 190,986

[30] Foreign Application Priority Data
Oct. 22, 1970 Switzerland.................... 15681/70

[52] U.S. Cl............. 219/69 G, 74/110, 204/143 M
[51] Int. Cl............................ B23p 1/04, B23p 1/14
[58] Field of Search............ 219/69 D, 69 E, 69 G; 74/110; 204/143 M

[56] References Cited
UNITED STATES PATENTS
3,590,210   6/1971   O'Connor..................... 219/69 G X
1,348,851   8/1920   Cook .............................. 74/110 X

*Primary Examiner*—R. F. Staubly
*Attorney*—Robert C. Hauke, Ernest I. Gifford and Claude A. Patalidis et al.

[57] ABSTRACT

An electro-erosion machining apparatus particularly adapted for electro-eroding workpieces of large dimensions and weight. The apparatus is provided with a frame supporting a pair of parallel platens, one of the platens being adjustably positionable at various positions relatively to the other platen. An intermediary platen, disposed between the two platens mounted on the frame of the apparatus, is supported from one of the platens by appropriate guiding means and is driven relatively thereto by way of a servo mechanism controlled by the servo control adapted to normally maintain a finite spacing between the surface of a workpiece and the working surface of an electrode tool in electro-erosion machining apparatus. The intermediary platen forms part of the workpiece and electrode tool assembly of the apparatus.

7 Claims, 6 Drawing Figures

INVENTORS
JEAN PFAU
HUBERT SCHAIDL
BY Hauke, Gifford & Patalidis
ATTORNEYS

INVENTORS
JEAN PFAU
HUBERT SCHAIDL

BY Hauke, Gifford & Patalidis
ATTORNEYS

ELECTRO-EROSION MACHINING APPARATUS

BACKGROUND OF THE INVENTION

The present invention has particular application in the field of electro-erosion technology, that is in electrochemical machining (ECM), as well as in electrical discharge machining (EDM). More particularly, the present invention relates to a particular arrangement of elements in an electro-erosion machining apparatus and to servo power drive mechanism for an electrode tool support means, or for a workpiece support means, for driving one relatively to the other with precision, while maintaining a substantially constant spacing between the workpiece and the electrode tool surfaces, and presents particular advantages when the electrode tool and the workpiece are of large dimensions and of heavy weight.

It is known that in electro-erosion machining, the minimum distance between the workpiece and the electrode tool must be constantly monitored for the purpose of maintaining with great precision such spacing to a predetermined value, for example as a function of the voltage supplied by the power supply and applied across the workpiece-electrode tool gap. If the distance separating the electrode tool from the workpiece becomes too wide, the electro-erosion machining operation becomes inefficient, dimensional accuracy and precision of shape are lost, while in EDM the electrical discharges between the electrode and the workpiece may cease entirely. If the distance separating the electrode tool from the workpiece becomes too narrow, arcing may occur, and even short circuits may be established between the electrode tool face and the workpiece, which cause considerable damages to the machined surfaces of the workpiece and to the electrode tool face.

In order to achieve ideal machining conditions, it is therefore generally necessary to maintain the distance between the workpiece and the electrode tool during machining to a well defined value. In order to maintain this distance constant during the machining operation, an accurate servo mechanism is used which is capable of imparting to the workpiece, or to the electrode tool, low amplitude, rapid and precise linear displacements, as a function of the electrical conditions present in the machining zone between the electrode tool and the workpiece surfaces.

Heretofore, electro-erosion machining apparatus have generally been designed along lines similar to hydraulic presses. Such apparatus are provided with a movable platen or ram, generally supporting the electrode tool, which is conventionally driven by way of one or several hydraulic jacks capable of linearly displacing the movable platen for a relatively considerable distance, for example one meter or more, to facilitate loading of the workpiece into the apparatus and mounting of the electrode tool on the movable platen. The hydraulic jacks must also be designed such as to be capable, in the course of a normal electro-erosion machining operation, of displacing the movable platen with precision for substantially short distances, such as a few centimeters only. Therefore, even the best designed electro-erosion machining apparatus represent of necessity a compromise in view of the contradictory requirements for a normal operation of such apparatus.

In addition, the lack of rigidity of such long stroke hydraulic jacks, the flexibility of the long stroke hydraulic jack cylinder and piston-rod assemblies, and the lack of stiffness of the long columns of hydraulic fluid filling the cylinders cause the movable platen to be subject to low frequency oscillations along its axis of displacement, as a result of the important mass consisting of the movable platen itself and of the elements mounted thereon, and of the movable portion of the hydraulic jacks, causing the resonance frequency of the assembly to be situated in the low frequency range.

When it is desired to machine by electro-erosion workpieces of large dimensions such as, for example, large forming dies as are used for stamping and forming body panels for motor vehicles, the workpieces and the corresponding electrode tools consist of very voluminous objects, which may weigh several tons or even several tens of tons, and the machining of such workpieces by electro-erosion means presents considerable difficulties for obtaining an exact positioning between the electrode tools and the workpieces and for providing a relative motion therebetween which is precisely controlled.

When such voluminous and heavy workpieces are machined by electro-erosion in giant apparatus, the speed of reaction of the servo mechanism advancing or retracting the electrode tool is much slower than the speed of reaction usually achieved in more conventional electro-erosion machines utilizing electrode tools weighing, at most, a few hundred kilograms. In addition, it is obvious that scaled-up conventional electro-erosion machines for machining heavy workpieces of large dimensions are very expensive to manufacture and difficult to operate.

SUMMARY

The present invention provides means for the electro-erosion machining of workpieces of large dimensions and important weight, with a minimum of expenditure and with great precision by way of a servo mechanism having a very short reaction time lag. The present invention contemplates utilizing apparatus presently available, such as, for example, the matching jigs used in the die sinking industry for determining the match or fit of the two half-portions of a forming die, and which are capable of supporting with great precision two large die sections of heavy weight in predetermined adjustable positions relatively to each other. The invention contemplates providing such apparatus with a servo mechanism endowed with a very short reaction time.

Consequently, the principal object of the present invention is to provide an apparatus for the electro-erosion machining of heavy workpieces of large dimensions, and which comprises an electrode tool holder, a workpiece holder, a power supply connected across the workpiece and the electrode tool for controllably passing an electric current between the workpiece and the electrode tool, means for supplying a dielectric fluid (in EDM) or, alternately, an electrolyte fluid (in ECM) in the space between the workpiece surface and the electrode tool face, and a servo mechanism controlling the spacing between the workpiece surface and the electrode tool face as a function of the electrical conditions present in the machining zone. The invention accomplishes its object by providing two parallel platens supported by the frame and capable of being rigidly positioned one relatively to the other at controllably variable distances, one of the platens supporting an intermediary platen parallel thereto and which is capable of short stroke displacement relatively thereto along an axis perpendicular to its surface, and a servo mechanism for effecting such short stroke displacement of the intermediary platen, the intermediary platen and the platen confronting the intermediary platen defining the electrode tool holder and the workpiece holder assembly.

Although the present invention has applications in both ECM and EDM, it will be described hereinafter as incorporated in an EDM apparatus.

The many objects and advantages of the invention will become apparent to those skilled in the art, when the following description of the best modes contemplated for practicing the invention is read in conjunction with the accompanying drawing.

DETAILED DESCRIPTION OF THE PREFERRED EMBODIMENTS

Figure 1:
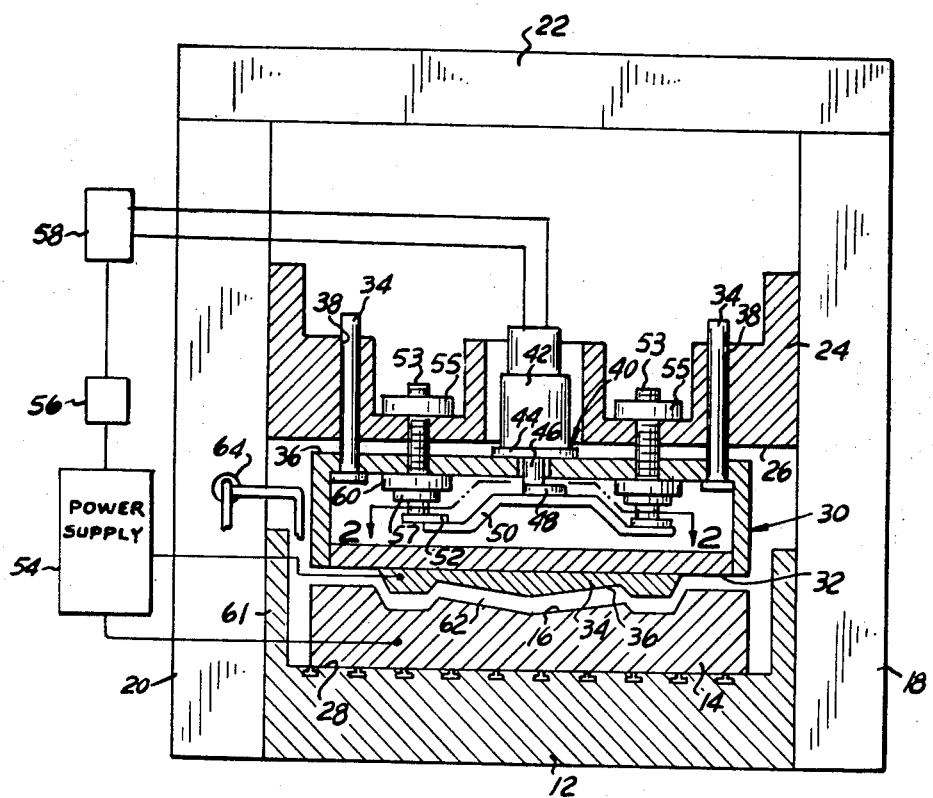
FIG. 1 is a schematic elevation view, partly in section to show the internal construction, of an example of structural embodiment of the invention.

Referring now to FIG. 1, an example of structural embodiment of the present invention is illustrated as incorporated in an apparatus such as is conventionally used for controlling and verifying the proper match of two stamping die sections. Such apparatus comprises a bed 12 adapted to support a half die section 14 fastened thereon by any convenient means such as clamps, not shown. For the purpose of the present invention the die section 14 represents the workpiece which is to be provided with a cavity 16 having a form which must conform exactly with the shape of a forming punch or other die half.

The apparatus is provided with a pair of substantially parallel lateral upright members 18 and 20, rigidly fastened to the bed 12 and rigidly interconnected at their upper end by way of a cross member 22. A movable platen 24 is supported by the lateral uprights 18 and 20 by way, for example, of hydraulic jacks or screw jacks, not shown, so as to be controllably movable vertically, as seen in FIG. 1, to any one of a plurality of infinitely, or finitely, variable positions towards and away from the bed 12 of the apparatus, the lower surface 26 of the movable platen 24 being always substantially parallel to the surface 28 of the table or bed 12. The movable platen 24 supports, suspended therebelow, an intermediary platen 30 provided with a face plate 32 on the surface of which is mounted an electrode tool 34 provided with a face 36 having a shape conforming to the shape of the cavity 16 which it is desired to obtain in the die block, or workpiece, 14. The intermediary platen 30 is hollow, and is laterally guided relatively to the movable platen 24 by way of, for example, four guide rods 34, two of which are only shown in FIG. 1, fastened to the rear plate 36 of the intermediary platen 30 and slidably projecting in corresponding longitudinal bores 38 disposed through the movable platen 24. Within the hollow intermediary platen 30 is disposed a portion of a servo mechanism, generally designated at 40, for providing a controlled displacement of the intermediary platen 30 relatively to the movable platen 24.

Figure 2:
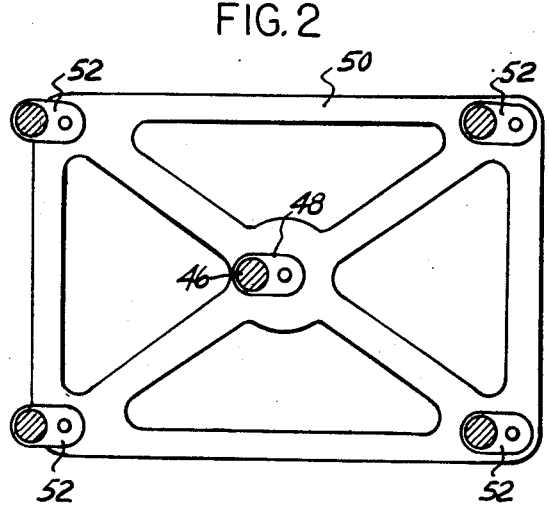
FIG. 2 is an enlarged top plan view of a portion of FIG. 1 as seen from line 2—2 of FIG. 1.
Figure 3:
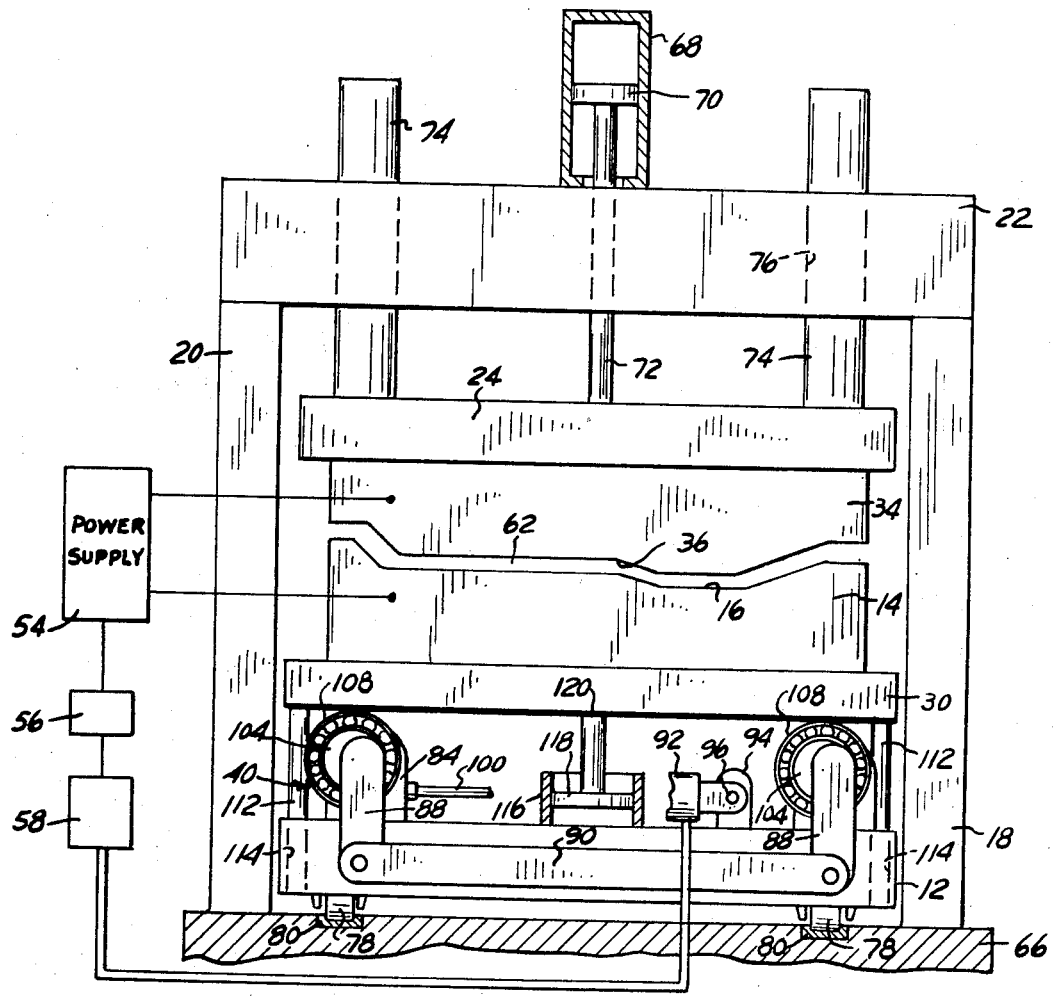
FIG. 3 is a schematic elevation view, with some portions broken away, of another example of structural embodiment of the present invention.

The servo mechanism 40 comprises a servo motor 42 fastened to the back of the rear plate 36 of the intermediary platen 30 by way of mounting means 44 and having a rotatable drive shaft 46 projecting to the interior of the intermediary platen. A crank member 48 is keyed or otherwise rigidly fastened to the end of the drive shaft 46. As shown in FIGS. 2 and 3, the servo motor crank member 48 imparts an oscillatory rotating motion to a rigid connecting member 50 adapted to transmit the motions of the crank member 48 to four crank members 52 each keyed, or otherwise fastened, at the lower end of a vertically disposed screw 53 projecting through the rear plate 36 of the intermediary platen 30 and threading in a nut 55 fastened to the upper movable platen 24. Each screw 53 is provided with a shoulder portion 57 proximate its respective crank member 52 within the platen 30 in sliding engagement with a thrust bearing member 60 affixed to the lower surface of the rear plate 36 of the intermediary platen 30. In this manner, the intermediary platen 30 is suspended from the movable platen 24, and is adapted to be driven by means of the drive shaft 46 of the servo motor 42 having its rotation transmitted by way of the crank member 46, the connecting member 50 and the driven crank members 52 to each screw 53, such that each revolution of the shaft 46 causes one revolution of each screw 53, all the screws 53 being rotated in unison. A power supply 54 is connected, in a conventional manner, across the workpiece 14 and the electrode tool 34, such power supply being capable, as is well known in the art of EDM, of supplying a pulse voltage of a predetermined value and frequency. The machining voltage supplied by the power supply 54 across the electrode tool and the workpiece is compared to a reference voltage by a differential comparator 56 adapted to operate a control 58 for the servo motor 42 as a function of the error detected between the machining voltage and the reference voltage by the differential comparator 56.

The bed 12, or stationary platen, of the apparatus is provided with walls 61 surrounding the workpiece 14, so as to form a reservoir for a dielectric liquid supplied by a pump 64 to the machining zone defined by the space 62 between the surface of the workpiece 14 and the face of the electrode tool 34. Appropriate conduits, not shown, are provided for the circulation of the dielectric liquid, and adequate fluid filtration means may be provided, as is well known in the art.

After the workpiece 14 has been rigidly fastened to the top surface 28 of the bed, or stationary platen 12, the movable platen 24 is displaced by means of its appropriate drive, not shown, until the electrode tool 34 mounted on the face plate 32 of the intermediary platen 30 is disposed in close proximity with the workpiece. The movable platen 24 is then securely clamped in position, by means not shown, and after the dielectric liquid circulation pump 64 and the power supply 54 have been turned on, the electro-erosion machining of an appropriate cavity 16 in the workpiece 14 may be effected with precision, by appropriate feed of the electrode tool 34 toward the workpiece 14 by way of the servo mechanism 40 under the control of the servo control 58. It is to be noted that the intermediary platen 30 is accurately guided in its linear movement by guide pins 34 which, being substantially short and rigid, insure precise control of the parallelism between the intermediary platen 30 and the stationary platen or bed 12 holding the workpiece 14, in spite of the substantially large dimensions and weight of the workpiece and electrode tool. The permissible stroke of the intermediary platen 30 relatively to the platen 24 is relatively short, for example, of the order of 50 millimeters, which permits to use relatively short guide pins 34 and jack screws 53, with the result that not only the assembly is provided with a substantial rigidity, but the movable portion of the electrode tool holder is endowed with a relatively high resonant frequency which results in a very precise guiding of the electrode tool movement and in a very short response time of the servo mechanism.

Figure 4:
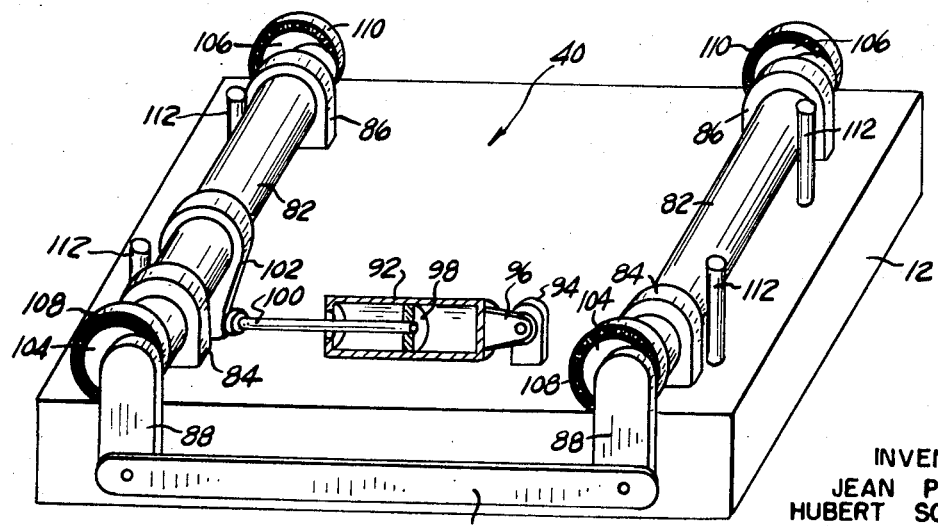
FIG. 4 is a schematic perspective view of a portion of the structure of FIG. 3.

In the example of embodiment of the invention, represented at FIGS. 3 and 4, the apparatus also consists of a pair of upright members 18 and 20 mounted on a base 66 and provided at their upper end with a cross member 22. The movable platen 24 is controllably displaceable upwardly and downwardly by way of a hydraulic jack consisting of a cylinder 68 mounted on the top of the cross member 22 and provided with a reciprocating piston 70 operatively connected to the movable platen 24 by way of a piston rod 72, the end of which is affixed to the movable platen 24. The parallelism of the platen 24, in the course of its rectilinear displacements, is insured by at least a pair of guide rods 74 affixed to the movable platen 24 and projecting through appropriate guide bushings disposed in the cross member 22 and each provided with a bore 76 adapted to slidably accept the peripheral surface of a guide rod 74.

In this modification of the invention, the electrode tool 34 is mounted on the lower surface of the movable platen 24, and the workpiece 14 is clamped to the top of the intermediary platen 30 disposed between the movable platen 24 and the stationary platen 12. In the embodiment illustrated, the stationary platen 12 is supported from the base 66 of the apparatus by means of rollers 78 engaging a pair of parallel rails 80, such that the platen 12 and the intermediary platen 30 supported thereon can be laterally displaced so as to be withdrawn from within the frame of the apparatus for loading of the workpiece 14 on the intermediary platen 30 by means of an overhead crane or any appropriate loading means. After loading of the workpiece, the platen 12 and the intermediary platen 30 mounted thereon and supporting the workpiece 14 clamped securely in position are returned to a position within the frame of the apparatus and the platen 12 is secured in position by means not shown.

The intermediary platen 30 is movable relatively to the stationary platen 12, as best seen in FIG. 4, by way of a pair of substantially parallel rotatable shafts 82, each supported by a pair of bearing boxes 84 and 86 affixed to the top surface of the stationary platen 12. The two rotatable shafts 82 are coupled by means of cranks 88 and connecting rod assembly 90, such that the shafts are caused to rotate in unison. The rotation of the shafts 82 is effected by means of a hydraulic jack consisting of a cylinder 92 pivotably attached at one end to a bracket 94 affixed to the stationary platen 12 by means of the clevis and pin assembly 96. A hydraulically reciprocable piston 98 is disposed within the cylinder 92 and is provided with a rod 100, the end of which is pivotally attached to an arm 102 fastened to one of the shafts 82. In this manner, it is obvious that when the piston 98 is caused to be displaced in a direction or another under the control of the servo control 58, the two shafts 82 are caused to rotate in unison in one direction or the other. On each of the shafts 82, proximate each end thereof, is fastened an eccentric circular cam as shown at 104 and 106, on the periphery of which is mounted a needle cylindrical bearing, as shown at 108 and 110. The intermediary platen 30 is therefore supported, as best shown in FIG. 3, at four corners by the peripheral surface of the outer race of the needle bearings 106 and 108, and the rotation of the shafts 82 causes rotation of the eccentric cams 104 and 106 which in turn causes, with very little friction, the displacement of the intermediary platen 30 relatively to the stationary platen 12, in one direction or the other, according to the direction or rotation of the shafts 82, which in turn depends from the direction of the linear displacement of the piston 98.

The axial positioning of the intermediary platen 30 relatively to the stationary platen 12 and the movable platen 24, during displacement of the intermediary platen, and the constant parallelism of the intermediary platen 30 in the course of such displacement is insured by four parallel guide rods 112, fastened to the bottom of the intermediary platen 30 and projecting through corresponding bores 114 disposed in the stationary platen 12. The greatest proportion of the weight of the intermediary platen 30 and of the workpiece 14 mounted thereon is supported by a pneumatic cushion consisting of an air cylinder 116, FIG. 3, mounted on the stationary platen 12 and provided with a piston 118 connected to the lower face of the intermediary platen 30 by way of a rod 120. In this manner, by varying the air pressure in the air cylinder below the piston 118, the weight of the intermediary platen 30 and the weight of the workpiece 14 carried thereby can be substantially compensated for, such that the load on the bearings 84 and 86 of the shafts 82, on the eccentrics 104 and 106 and on the needle bearings 108 and 110 can be substantially relieved, and the force exerted by the servo system including the hydraulic cylinder 92 is substantially reduced to a small value.

In the embodiment of the invention, illustrated at FIGS. 3 and 4, after the workpiece 14 has been loaded on the intermediary platen 30 the movable platen 24, which is also the electrode tool holder, is displaced by means of the hydraulic cylinder 68 such that the electrode tool 34 is located a short distance away from the surface of the workpiece 14. The movable platen 24 is then locked in position, by means not shown, and the electro-erosion machining is begun by turning on the power supply 54 after turning on the circulation of dielectric fluid in the usual manner. In this embodiment of the invention, it is the workpiece 14, supported by the intermediary platen 30, which is advanced toward the stationary electrode tool 34 as a result of the servo control 58 activating the hydraulic cylinder 92, which in turn causes rotation of the shafts 82 thus angularly displacing the eccentrics 104 and 106 mounted on each shaft, causing in turn upward motion of the intermediary platen 30. The servo system constantly controls precisely and rapidly the advance of the workpiece 14 relatively to the electrode tool 34, and also the spacing or gap separating the workpiece and the electrode tool surfaces in the machining zone 62. The reaction time of the servo mechanism is very short because of the rigidity of the hydraulic system and of the mechanical elements causing the motion of the intermediary platen 30 relatively to the stationary platen 12.

Figure 5:
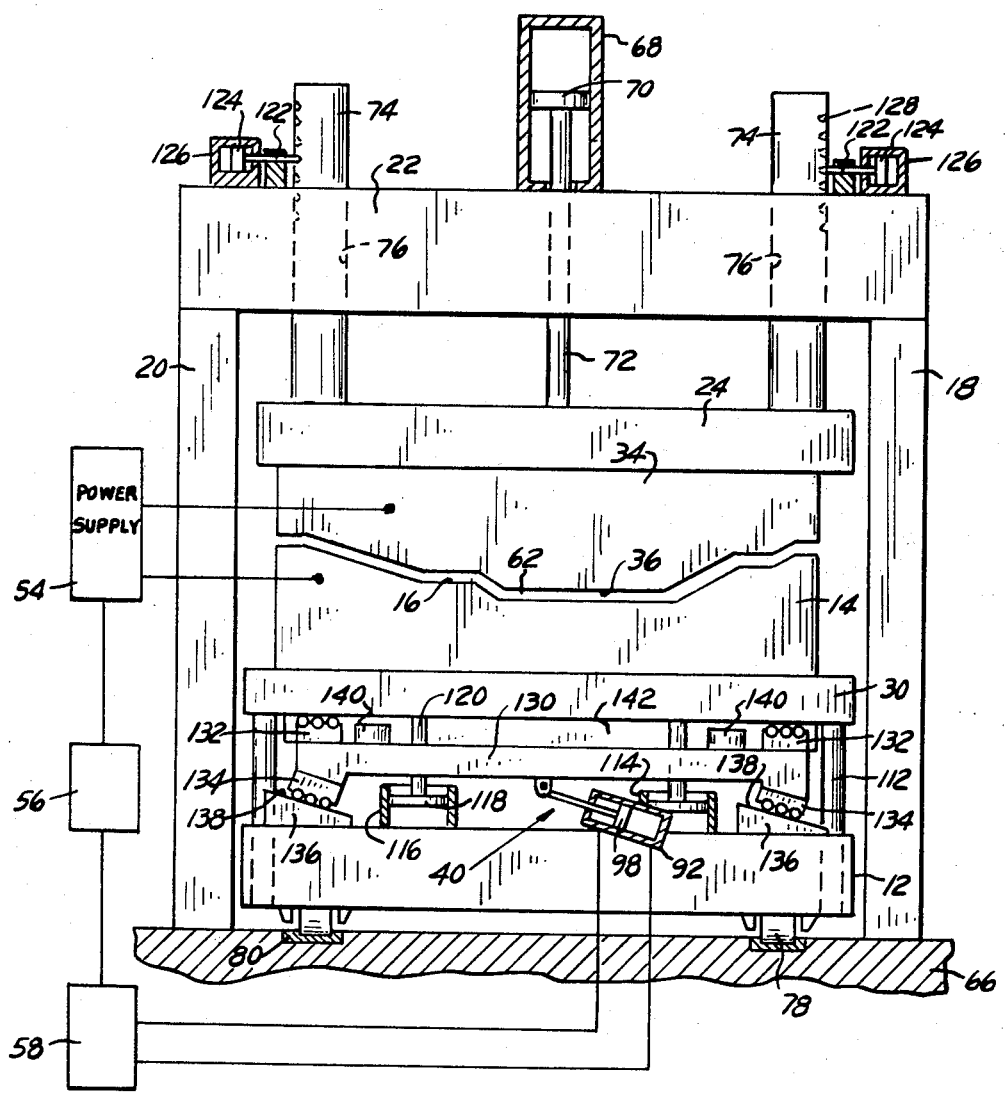
FIG. 5 is a schematic elevation view, with some portions broken away, of a further example of structural embodiment of the present invention.

The embodiment of the invention illustrated at FIG. 5 is identical to the arrangement illustrated at FIG. 3, except with respect to the means for causing the controlled displacement of the intermediary platen 30 relatively to the stationary platen 12, as will be described hereinafter. FIG. 5 also illustrates means whereby the movable platen 24, supporting the electrode tool 34, may be locked in any one of a plurality of finite positions. This is effected by means of a locking pin 122 actuated by a piston 124 reciprocably mounted in a cylinder 126 fastened to the top of the frame cross member 22. The end of the locking pin 122 is adapted to engage one of a plurality of regularly spaced notches 128 formed on a portion of the peripheral surface of each guide rod 74. While the movable platen 24 is displaced under the action of the hydraulic cylinder 68, each locking pin 122 is retracted by introducing fluid, hydraulic or pneumatic, on the appropriate side of the piston 124 in each cylinder 126. Once the platen 124 has been displaced to a position presenting the face of the electrode tool 34 in appropriate close proximity to the surface of the workpiece 14, each piston 124 is actuated so as to cause the engagement of the end of the corresponding locking pin 122 with a notch 128 so as to immobilize each guide rod 74 relative to the cross member 22 of the apparatus and lock the platen 24 securely in position.

Figure 6:
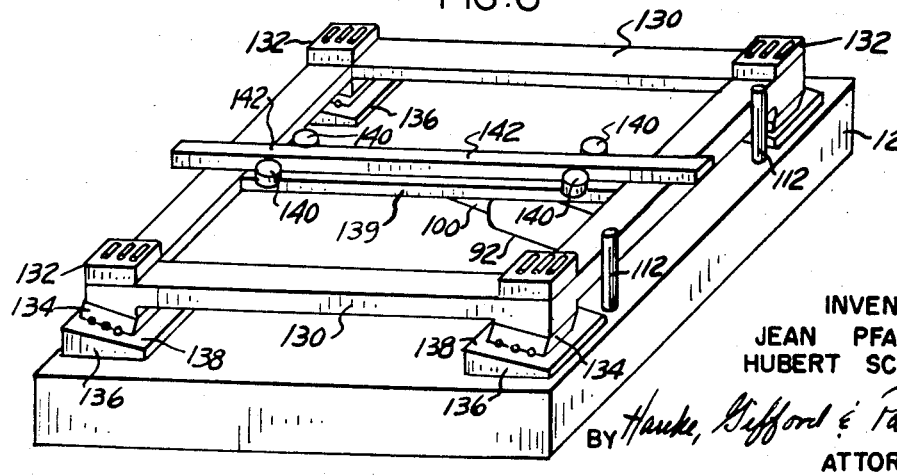
FIG. 6 is a schematic perspective view of a portion of the structure shown in FIG. 5.

In the embodiment of FIG. 5, the intermediary platen 30 is displaced relative to the stationary platen 12 under the control of the servo control 58 by way of a servo mechanism which, as best seen in FIG. 6, consists of a rigid square or rectangular frame 130, provided at the upper portion of each of its corners with a roller rectilinear bearing 132 engaging the lower surface of the intermediary platen 30. The lower portion of each corner of the rigid frame 130 is provided with a wedge means which, as illustrated, consists of a rectilinear roller bearing 134 disposed at an angle relatively to the plane of action of the corresponding rectilinear roller bearing 132 disposed on the top of the frame 130. Each inclined roller bearing 134 is supported by a wedge block 136 affixed to the top surface of the stationary platen 12 and each defining a similarly inclined ramp surface 138 engaged by the rollers of each roller bearing 134. The rigid frame 130 is linearly movable laterally by way of a servo hydraulic cylinder 92 which is supported on one end from the stationary platen 12 by way of a clevis and pin assembly, for example, not shown. The hydraulic cylinder 92 is provided with a reciprocable piston 98 whose rod 100 is pivotably attached to a cross bar member 139, FIG. 6, fastened to the rigid frame 130, such that when the piston 98 is reciprocated there results a lateral reciprocation of the rigid frame 130 which in turn causes the inclined bearings 134 at each corner to climb or descend the inclined ramps 138 of the corner wedge blocks 136, according to the direction of displacement of the piston 98. In this manner, when the frame 130 is displaced to the left, as seen in FIG. 5, the platen 30 is moved upwardly, and vice-versa, the platen 30 remaining constantly parallel to itself, the guiding pins 112 preventing any lateral or radial motion of the intermediary platen 30 relatively to the stationary platen 12. The rigid frame 130 is guided during its lateral motion by way of guide rollers 140, supported by the cross bar member 139, in rolling engagement with the lateral faces of a guide rail 142 attached to the lower surface of the intermediary platen 30.

In the embodiment of FIG. 5, the dead weight of the intermediary platen 30 and of the load supported thereby is also compensated by means of, for example, four adjustable air cushions each consisting of a cylinder 116, in which is disposed a piston 118 supporting the intermediary platen 30 by means of a rod 120. By using, for example, four air cylinders 116 symmetrically disposed at four points below the intermediary platen 30, the weight of any uneven mass supported by the intermediary platen 30 may be compensated for by introducing air at different pressures in the cylinders 116.

Although not shown at FIGS. 3 and 5, the workpiece 14 is disposed in a reservoir mounted on the intermediary platen 30 for containing the dielectric fluid used during the electro-erosion machining of the workpiece, and appropriate pumping means and plumbing are provided for circulating the fluid through the machining zone 62 in the space or gap between the machined surface of the workpiece and the active face of the electrode tool.

It will be obvious to those skilled in the art that the present invention permits to effectuate with precision the electro-erosion machining of workpieces of considerable dimensions and weight, and that various modifications of the apparatus of the invention may be made without departing from the spirit and scope thereof.

What is claimed as new is:

1. In an electro-erosion machining apparatus comprising a frame, an assembly formed of an electrode tool holder supporting an electrode tool and a workpiece holder supporting a workpiece, a power supply connected across said electrode tool and said workpiece, means for supplying a fluid between said electrode tool and said workpiece and servo control means for continuously controlling the spacing between said electrode tool and said workpiece, the improvement comprising a pair of substantially parallel platens supported by said frame, means for adjustably positioning said platens relatively to each other at variable fixed distances from each other independently of said servo control means, an intermediary platen disposed between said first mentioned platens substantially parallel thereto and displaceably supported by one of said first mentioned platens, means guiding the displacement of said intermediary platen relative to said platen supporting said intermediary platen, said intermediary platen and the other of said first mentioned platens defining said electrode tool holder and workpiece holder assembly, and a servo mechanism for displacing said intermediary platen relatively to said platen supporting said intermediary platen for a relatively short distance under the control of said servo control means.

2. The improvement of claim 1 further comprising adjustable pneumatic cushioning means between said intermediary platen and said one of said first mentioned platens for substantially balancing the weight of said intermediary platen and of elements mounted thereon.

3. The improvement of claim 1 wherein said servo mechanism comprises a plurality of substantially parallel jack screws interconnecting said intermediary platen and said one of said first mentioned platens and a servo motor for rotating said jack screws in unison.

4. The improvement of claim 3 wherein a driven crank member is mounted on an end of each of said jack screws, a driving crank member is coupled to said servo motor and a rigid common connecting member is disposed between said driving crank member and said driven crank members for driving said driven crank members in unison.

5. The improvement of claim 1 wherein said servo mechanism comprises a pair of substantially parallel shafts each having an axis of rotation substantially parallel to said intermediary platen, said shafts being disposed between said intermediary platen and said one of said first mentioned platens, camming means mounted on each of said shafts in engagement with said intermediary platen and servo motor means for rotating said shafts in unison for causing displacement of said intermediary platen.

6. The improvement of claim 1 wherein said servo mechanism comprises movable wedge means disposed between said intermediary platen and said one of said first mentioned platens, said wedge means being in sliding engagement with conforming ramp means dependent from at least one of said intermediary platen and said one of said first mentioned platens, and servo motor means for displacing said wedge means in unison for in turn causing displacement of said intermediary platen.

7. The improvement of claim 1 further comprising support means for one of said first mentioned platens for permitting said platen to be displaced relatively to the other in a plane substantially parallel to said platens.

* * * * *